United States Patent
Delaviz et al.

(10) Patent No.: US 6,706,808 B2
(45) Date of Patent: *Mar. 16, 2004

(54) BINDER COMPOSITIONS EXHIBITING REDUCED EMISSIONS

(75) Inventors: Yadollah Delaviz, Granville, OH (US); Susan Muench, Heath, OH (US); Kathleen Bullock, Zanesville, OH (US)

(73) Assignee: Owens Corning Fiberglas Technology, Inc., Summit, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,056

(22) Filed: Aug. 3, 1999

(65) Prior Publication Data
US 2001/0009945 A1 Jul. 26, 2001

(51) Int. Cl.[7] ............... C08J 3/00; C08K 3/20; C08L 61/00; C08H 5/02; D04H 3/16
(52) U.S. Cl. ............ 524/594; 156/167; 524/595; 524/596; 524/597; 524/598; 524/735; 524/745; 524/841; 527/400; 527/403
(58) Field of Search ............. 524/594, 595, 524/596, 597, 598, 735, 745, 841; 527/400, 403; 156/167

(56) References Cited

U.S. PATENT DOCUMENTS

| | | | |
|---|---|---|---|
| 3,336,185 A | 8/1967 | Helbing | |
| 3,956,205 A | 5/1976 | Higginbottom | |
| 4,095,010 A | 6/1978 | Zellar et al. | |
| 4,480,068 A | 10/1984 | Santos et al. | |
| 5,473,012 A | * 12/1995 | Coventry et al. | 548/841 |
| 5,578,371 A | 11/1996 | Taylor et al. | |

FOREIGN PATENT DOCUMENTS

| | | |
|---|---|---|
| CS | 241411 | 2/1988 |
| DE | 3815204 | 11/1989 |
| DE | 3936886 | 11/1989 |
| EP | 038 408 | 10/1981 |
| EP | 211531 A2 | 2/1987 |
| GB | 1 293 744 | 10/1972 |
| JP | 6140544 | 9/1986 |
| JP | 63230760 | 9/1988 |
| JP | 04234479 | 8/1992 |
| SU | 1799888 | 3/1993 |
| WO | WO 99/32534 | 7/1999 |

* cited by examiner

Primary Examiner—Patrick D. Niland
(74) Attorney, Agent, or Firm—Inger H. Eckert; Stephen W. Barns; Maria C. Gasaway

(57) ABSTRACT

The presently disclosed invention relates to a phenolic binder comprising a premix of a urea modified phenol-formaldehyde resole resin, a curing agent, and an additive selected from the group consisting of ammonium lignosulfonate, melamine and a melamine derivative. A method for reducing gaseous emissions in the manufacture of fibrous insulation materials is also disclosed.

22 Claims, 3 Drawing Sheets

BINDER COMPOSITIONS EXHIBITING REDUCED EMISSIONS

TECHNICAL FIELD AND INDUSTRIAL APPLICABILITY OF THE INVENTION

The present invention relates to phenolic binder formulations. More particularly, the present invention pertains to a urea modified phenol-formaldehyde composition containing melamine, melamine derivatives, and/or ammonium lignosulfonate (hereinafter also referred to as "lignin"). The binder compositions of the present invention produce lower gaseous emissions, while at the same time add to the overall stability of the premix and binder system. The binders of the present invention are particularly useful in the manufacture of glass wool insulation materials.

BACKGROUND OF THE INVENTION

Phenol-formaldehyde binders have been widely used in the manufacture of glass fiber and glass wool insulation materials. They have a low viscosity in their uncured state, yet form a rigid thermoset polymeric matrix for the glass fibers when cured. A low binder viscosity in the uncured state allows for the vertical expansion of the coated mat when it exits the forming chamber, while the rigid matrix of the cured product ensures that the finished fibrous glass thermal or acoustical insulation product returns to its original dimensions after it has been compressed for packaging and shipping.

However, the phenol-formaldehyde resole binders contain a fairly large excess of formaldehyde from the manufacturing process. For environmental reasons and in order to lower the amount of phenol used in the manufacture of these phenolic binders, a much higher ratio of formaldehyde to phenol is used in the preparation of the resole part of the phenol-formaldehyde binder. Therefore, more recently, the phenol-formaldehyde resole binders have been modified using urea. Urea is added to the phenol-formaldehyde resole to react with the free formaldehyde. Upon completion of this process for manufacturing the urea modified phenol-formaldehyde binder the free formaldehyde level is well below 1% of the amount of formaldehyde used. However, due to the vast amounts of binder used in the manufacture of insulation products, the release of that free formaldehyde into the environment is a concern. Further, it has been found that the modification of these phenol-formaldehyde resole resins with urea reduces the stability of the resin. Accordingly, there is a need for improved urea modified phenol-formaldehyde binder formulations with greater stability, and which emit lower gaseous materials into the environment. In particular, there is a need for binders which emit lower levels of phenol, formaldehyde and ammonia.

The use of urea and ammonia as formaldehyde scavengers for use in phenol-formaldehyde resins is disclosed in U.S. Pat. No. 3,956,205. Further, U.S. Reissue Pat. No. 30,375 discloses the use of ammonia to raise the pH of a binder including a resole resin, urea and an acid catalyst for elevated temperature cure of the binder. U.S. Pat. No. 4,757,108 discloses a phenolic resole-urea composition made by the reaction of urea with the free formaldehyde in the phenolic resole resin under acid conditions, the composition subsequently being made neutral or slightly basic by further addition of urea. The aforementioned U.S. patents are herein incorporated by reference.

SUMMARY OF THE INVENTION

This invention relates to compositions that allow for reduced emissions from phenolic binders. Further, the present invention also relates to phenolic binder compositions having improved binder stability and accelerated cure rates.

The phenolic binders of the present invention comprise:
(a) a premix of a urea modified phenol-formaldehyde resole resin;
(b) a curing agent; and
(c) an additive selected from the group consisting of at least one of ammonium lignosulfonate, melamine, and melamine derivative.

Further objects, features and advantages of the present invention will become apparent from the detailed description that follows.

DETAILED DESCRIPTION AND PREFERRED EMBODIMENTS OF THE INVENTION

Figure 1:
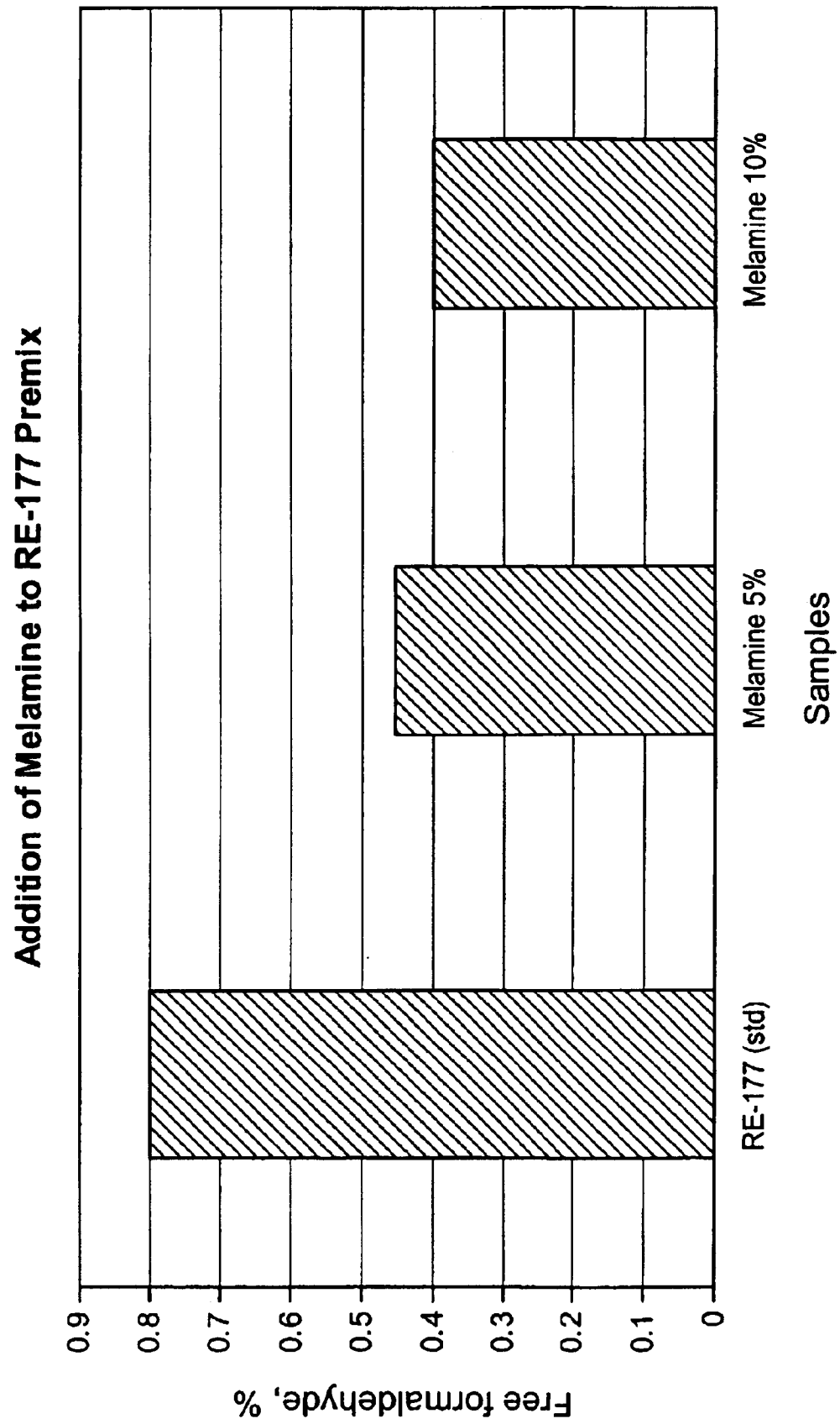
FIG. 1 is a bar graph depicting the effect of a melamine additive on the % of free formaldehyde in the urea modified phenol-formaldehyde premix.

The phenolic binder of the present invention comprises a premix of a urea modified phenol-formaldehyde resole resin, a curing agent, and an additive selected from the group consisting of at least one of ammonium lignosulfonate, melamine, and melamine derivative.

Any suitable premix of a urea modified phenol-formaldehyde resole resin known to one of ordinary skill in the art may be used. The premix may be prepared in advance of the preparation of the binder of the present invention, or may be supplied by a resin manufacturer, and stored until it is required for use to prepare the binder of the present invention. The premix of a urea modified phenol-formaldehyde resole resin for use in the present invention can be prepared by conventional methods known in the art. Suitable premixes for use in the present invention and methods for their manufacture are disclosed in U.S. Pat. No. 5,300,562, which is herein incorporated by reference.

Preferably, the premix of a urea modified phenol-formaldehyde resole resin has a molar ratio of formaldehyde to urea of 1.1:1. More preferably, the premix of a urea modified phenol-formaldehyde resole resin is prepared using the method and some or all of the reagents and conditions disclosed below. Thus, in a preferred embodiment of the present invention, the premix of a urea modified phenol-formaldehyde resole resin is prepared by mixing a urea solution (50% in water) with phenolic resole resin (~43% solids in water). The mixture is agitated at 90° F. (31.5° C.) for about 120 minutes during which time the urea reacts with the formaldehyde. The free formaldehyde level of the resulting solution drops from about 14% at the beginning of the cook to well below 1% by the end of the premix cook. The resulting premix of a urea modified phenol-formaldehyde resole resin is hereinafter referred to as "RE-177."

Even more preferably, the binder of the present invention comprises between about 42–50% of the premix of a urea modified phenol-formaldehyde resole resin based upon the total weight of the binder solids.

Any suitable curing agent known to one of ordinary skill in the art may be used to cure the urea-modified resole resin of the present invention. Suitable curing agents include acid catalysts such as salts, preferably ammonium or amino salts of acids, such as ammonium sulfate, ammonium phosphate, ammonium sulfamate, ammonium carbonate, ammonium acetate, ammonium maleate, and the like. The curing agent can be added in an amount of from 0.1 to 5% by weight based on the weight of the premix of the urea modified phenol-formaldehyde resole resin.

However, some curing agents can be a source of instability to the binder system. For example, when ammonium sulfate is used as the curing agent in urea modified phenol-formaldehyde resole resins, because of its high solubility parameter in water, the ammonium sulfate tends to degrade and cause the release of sulfuric acid and ammonia. The release of sulfuric acid lowers the premix or binder pH which in turn causes high end phenolic (dimers and trimers) and dimethylol urea to precipitate out of the solution. Further, it has also been found that the use of high levels of ammonium sulfate causes the binder to precure resulting in problems in the insulation manufacturing plants.

It has now been discovered that binders of the present invention comprising ammonium lignosulfonate form a much more stable system. Specifically, the partial replacement of the curing agent with ammonium lignosulfonate in the premix binder system results in a binder having improved stability and a longer shelf life. It is thought that the ammonium lignosulfonate acts to reduce the agglomeration of the phenolic dimers and trimers, and thus helps to keep them soluble and in solution. Consequently, the partial replacement of the curing agent with ammonium ilignosulfonate reduces gaseous emissions from the binder systems, including ammonia emissions.

Ammonium lignosulfonate is commercially available from many different chemical suppliers and as various different brands. Any suitable brand of ammonium lignosulfonate may be used in the present invention. For example, suitable sources and brands of ammonium lignosulfonate are set forth in Tables 1 and 2 below. Because ammonium lignosulfonate has a deep dark color, the color and appearance of the insulation product may be a limiting factor on the amount of ammonium lignosulfonate that one incorporates into the binder formulation. This is particularly true when the binders of the present invention are used to prepare pink or yellow insulation products. However, one of ordinary skill in the art will realize that higher levels of suitable dyes may be used to compensate for the effect of using higher levels of ammonium lignosulfonate on the color of the final product. Although the color of the ammonium lignosulfonate is very much dependent upon its natural source and the chemical processes that it has gone through, it has been found that up to about 10% of ammonium lignosulfonate based upon the weight of urea may be incorporated into the binder formulation of the present invention without significant degradation to the color of the insulation products made therefrom.

In a preferred embodiment the ammonium lignosulfonate is "Borresperse HN" which is commercially available from Lignotech. When "Borresperse NH" is used, the binders of the present invention demonstrated superior properties including strength, whilst the "Borresperse NH" demonstrated minimal adverse effects to the color of the insulation products when used up to about 10% based upon the weight of urea.

In a more preferred embodiment of the present invention, an amount of ammonium lignosulfonate is used to partially replace the curing agent up to about 35% based upon the weight of the curing agent. Even more preferably, "Borresperse HN" replaces up to about 35% of an ammonium sulfate curing agent based upon the amount of ammonium sulfate required to cure the urea modified phenol-formaldehyde binder absent ammonium lignosulfonate.

The ammonium lignosulfonate may be added to the binder system before, after or at the beginning of the premix cook. For example, the ammonium lignosulfonate may be added: (1) at the end of the premix cook, i.e. extending the premix cook for one hour more before the ammonium lignosulfonate is added; (2) at beginning of the cook, i.e. adding the ammonium lignosulfonate to the phenol-formaldehyde premix and cooking it for about one hour and then adding the urea before completing the normal premix cooking profile; or (3) in middle of the cook, i.e. adding the ammonium lignosulfonate to the phenol-formaldehyde premix after about one hour or any time between these points. The point at which the ammonium lignosulfonate is added to the phenol-formaldehyde premix does not significantly effect the amount of the free formaldehyde in the premix.

EXAMPLE I

Experiments were carried out to investigate the effect of ammonium lignosulfonate on the curing behavior of various premixes. In particular, the curing behavior of an RE-177 premix (control), as defined above, was compared to similar RE-177 based premixes that also contained various ammonium lignosulfonate additives.

Prior to testing, the phenolic resin/urea/additive mixtures were stirred at 31.5° C. for three hours, unless indicated otherwise. The temperature of the mixtures was kept constant using a water bath. 40 iL samples containing 15% solids were prepared for testing. The resulting samples (premixes) were tested using a "982-Dynamic Mechanical Analyzer" manufactured by TA Instruments. The parameters of the Dynamic Mechanical Analyzer were set to: equilibrate at 300 C—isothermal 0.50 min.; ramp at 50° C./min. to 110° C./min.—isothermal 10 min.; and ramp at 50° C./min. to 180° C./min.—isothermal 12 min.

As set forth in Table 1, RE-177 premix (control) comprising 3.75% ammonium sulfate had a strength modulus of about 20–22 Hz, with a flat curve up to 230° F. (110° C.), i.e. no precure. The results of the experiments indicate that, in general, the addition of ammonium lignosulfonate causes the premix to cure faster. Accordingly, ammonium lignosulfonate may be used as a cure accelerator for phenolic binders. The results of the experiments also demonstrate that the addition of ammonium lignosulfonate can lower the strength modulus to as low as 15 Hz, compared to the control having a strength modulus of between 20–22 Hz. Therefore, ammonium lignosulfonate may also be used as an extender for phenolic resins. Interestingly, it has also been discovered that the addition of ammonium lignosulfonate to the phenolic premix also reduces the adhesion of the premix to glass slides. For example, premixes containing 7.5–10% ammonium lignosulfonate start to delaminate from glass slides after 3 days as compared to 2 weeks for the control.

TABLE 1

The results of dynamic mechanical analyzer (DMA)

| Samples | Strength modulus (Frequency, Hz) | Pre-cure* | Ammonium Sulfate, % |
|---|---|---|---|
| Control | 20-22 | 0 | 3.75% |
| Borresperse NH, 7.5% | 17 | 2 | 3.75% |
| Borresperse NH, 10% | 20 | 4 | 3.75% |
| Borresperse, 12.5% | 20.5 | 5 | 3.75% |
| Borresperse, 15% | 18 | 4 | 3.75% |
| Norlig TSD, 10% | 22 | 6 | 3.75% |
| Norlig TSD, 12.5% | 24 | 7.5 | 3.75% |
| Norlig TSD, 15% | 25 | 8 | 3.75% |
| Lignosite 1740, 7.5% | 17 | 0.5 | 3.75% |
| Lignosite 1740, 10% | 18 | 1 | 3.75% |
| Lignosite 1740, 12.5% | 19 | 0 | 3.75% |
| Lignosite 1740, 15% | 18 | 3 | 3.75% |
| European, AVBN T5, 7.5% | 23.5 | 2 | 3.75% |
| European, AVBN T5, 10% | 22 | 3 | 3.75% |
| European, AVBN T5, 12.5% | 22 | 2.5 | 3.75% |
| European, AVBN T5, 15% | 22 | 3 | 3.75% |
| Substitution of lignin for Resin | 18 | 0.5 | 3.75% |

TABLE 1-continued

The results of dynamic mechanical analyzer (DMA)

| Samples | Strength modulus (Frequency, Hz) | Pre-cure* | Ammonium Sulfate, % |
|---|---|---|---|
| Lignin, Borresperse NH, 2.5% | | | |
| Borresperse NH, 5% | 15 | 2 | 3.75% |
| Adjusting ammonium sulfate level with Lignin, Borresperse NH | | | |
| Control, Borresperse, 9% | 18 | 0 | 2.25% |
| Control, Borresperse, 9% | 19 | 0 | 2.5% |
| Control Borresperse, 9% | 18.5 | 1 | 2.75% |

*some arbitrary numbers are used to judge the precure evidence from the DMA histogram. 0 is used for a flat curve up to the first 15 minutes and a temperature of 25° C. (77° F.). The higher the number, the larger the deviation from a flat curve.

As set forth in Table 2, experiments were also carried out to determine the effect of replacing urea of an RE-177 premix (control) with ammonium lignosulfonate, as opposed to using ammonium lignosulfonate as an additive to the urea modified phenolic premix. As can be seen from the results of those experiments, replacing urea with ammonium lignosulfonate tends to result in an increase in the free formaldehyde at the end of the premix cooking.

TABLE 2

The Formaldehyde uptake by replacing urea with different kinds/brands of ammonium lignosulfonate ("lignin").

| Samples | Lignin, % | Solids, % | Free CH$_2$O, % |
|---|---|---|---|
| Control | 0.0 | 45.43 | 0.85 |
| Borresperse NH | 7.5 | 45.6 | 1.27 |
| Borresperse NH | 10 | 45.7 | 1.59 |
| Borresperse NH | 15 | 46.4 | 2.08 |
| Norlig TSD | 0.0 | 45.3 | 1.11 |
| Norlig TSD | 7.5 | 49.6 | 1.30 |
| Norlig TSD | 10.0 | 47.1 | 1.80 |
| Norlig TSD | 12.5 | 49.3 | 2.36 |
| Norlig TSD | 15.0 | 50.0 | 3.48 |
| AVBN T5 European | 0.0 | 49.0 | 0.96 |
| AVBN T5 European | 7.5 | 49.0 | 1.36 |
| AVBN T5 European | 10.0 | 49.2 | 1.35 |
| AVBN T5 European | 12.5 | 48.9 | 1.37 |
| AVBN T5 European | 15.0 | 49.2 | 1.52 |
| Borresperse NH | 0.0 | 45.1 | 0.65 |
| Borresperse NH | 7.5 | 38.3 | 0.60 |
| Borresperse NH | 10.0 | 52.4 | 2.2 |
| Borresperse NH | 12.5 | 51.9 | 2.72 |
| Borresperse NH | 15.0 | 49.3 | 3.0 |
| Lignosite 1740 | 0.0 | 46.3 | 1.06 |
| Lignosite 1740 | 7.5 | 46.30 | 0.86 |
| Lignosite 1740 | 10.0 | 46.4 | 1.28 |
| Lignosite 1740 | 12.5 | 46.7 | 1.50 |
| Lignosite 1740 | 15.0 | 45.6 | 1.52 |
| Control | 0.0 | 46.13 | 0.97 |
| Borresperse | 10.0 | 46.7 | 1.21 |
| Lignosite 17 | 10.0 | 46.8 | 1.16 |
| Lignosite 1740 | 10.0 | 46.4 | 1.50 |
| Lignosite 260 | 10.0 | 46.4 | 0.83 |
| Lignosite 823 | 10.0 | 46.7 | 0.78 |
| Tembec Ammonium Lignosulfonate (Canadian source) | | | |
| Control | 0.0 | 45.86 | 0.641 |
| Tembec | 5.0 | 45.91 | 0.785 |
| Tembec | 7.5 | 46.17 | 1.00 |
| Tembec | 10.0 | 46.33 | 1.11 |

EXAMPLE II

As discussed above, it has now been discovered that the use of melamine and/or a melamine derivative additive to urea modified phenol-formaldehyde binders reduces gaseous emissions. At the same time the addition of melamine and/or ammonium lignosulfonate will also reduce the phenol emissions simply through dilution factor. The use of such additives may reduce both formaldehyde and ammonia emissions up to about 30% without having adverse effects on the shelf life and stability of the premix of the urea modified phenol-formaldehyde resole resin binders.

Because the preparation of the phenol-formaldehyde premix involves the reaction of urea with the free formaldehyde to form methylol urea adducts, and because that reaction in the manufacturing plants occurs anywhere from about room temperature 25° C. (77° F.) to about 46° C. (115° F.), preferably the melamine additive is added to the binder of the present invention by dissolving it in the premix of the urea modified phenol-formaldehyde resole resin at room temperature or slightly higher. This helps avoid exposing the phenolic part of the premix to higher temperatures. Tables 3–5 show that the optimal temperature at which the melamine is added is about 32° C. (98° F.). That is the temperature that maximizes uptake of the formaldehyde by melamine. Whereas Tables 4–5 demonstrate that increased temperatures, 37° C. and 42° C. respectively, do not serve to significantly increase the reaction between melamine and formaldehyde. Table 3 demonstrates that addition of just 3.38 grams of melamine to 100 grams of premix (5 weight % based on the weight of the phenolic solids) carried out at the optimal temperature will reduce the formaldehyde in the premix by 42%, (See also FIG. 1).

TABLE 3

Addition of melamine to urea solution. Premix cooking at 32° C. (90° F.).

| Samples | RE-177 g | Melamine g | Melamine % | Time* hrs | Solids % | Free CH$_2$O** % | Stroke Cure, sec. start | end |
|---|---|---|---|---|---|---|---|---|
| 6677-85A | 100 | 0 | 0 | NA | 46.25 | 0.792 | 29 | 78 |
| 6677-85B | 100 | 3.38 | 5 | 2.75 | 48.03 | 0.454 | 33 | 88 |
| 6677-85C*** | 100 | 6.75 | 10 | >3 | 48.46 | 0.402 | 62 | 108 |

*time taken to dissolve melamine in the premix.
**hydroxyl amine hydrochloride method.
***1.81 g melamine remained undissolved. Measurements are based on solution only.

TABLE 4

Addition of melamine
to urea solution. Premix cooking at 37° C. (99° F.).

| Samples | RE-177, g | Mela-mine, g | Mela-mine, % | Time, hrs. | % Solids | Free CH$_2$O$_1$ % |
|---|---|---|---|---|---|---|
| 6677-86A | 100 | 0 | 0 | NA | 45.82 | 0.593 |
| 6677-86B | 100 | 3.38 | 5 | 1.5 | 47.59 | 0.422 |
| 6677-86C* | 100 | 6.75 | 10 | >3 | 48.69 | 0.461 |

*1.16 g melamine remained undissolved.

TABLE 5

Addition of melamine
to urea solution. Premix cooking at 42° C. (108° F.).

| Samples | RE-177, g | Mela-mine, g | Mela-mine, % | Time, hrs. | % Solids | Free CH$_2$O$_1$ % |
|---|---|---|---|---|---|---|
| 6677-87A | 100 | 0 | 0 | NA | 46.35 | 0.514 |
| 6677-87B | 100 | 3.38 | 5 | 65 min. | 48.24 | 0.424 |
| 6677-87C* | 100 | 6.75 | 10 | >3 hours | 49.76 | 0.407 |

*064 g melamine remained undissolved.

EXAMPLE III

Because melamine is more expensive than phenol, formaldehyde and urea, experiments were performed to determine the most efficient use of melamine. The results of the experiments, as set forth in Tables 6–8 demonstrates that replacing urea with melamine does not maximize formaldehyde up-take. It is thought that urea reacts faster and more efficiently than melamine with formaldehyde. For example, as can be seen from Table 6, replacing urea with melamine by 5% weight, will reduce formaldehyde only about 15% versus 42% if melamine is instead added as an additive and not as a urea replacement.

TABLE 6

Melamine replacing urea weight/weight. Premix cooking at 32° C. (90° F.) for 3 hours.

| Samples | Urea (50%) g | Melamine g | Melamine % | Time mins. | Solids % | Free CH$_2$O % | Stroke Cure, sec. start | end |
|---|---|---|---|---|---|---|---|---|
| 6677-92A | 32.5 | 0 | 0 | NA | 45.58 | 0.747 | 40 | 88 |
| 6677-92B | 31.7 | 0.81 | 5 | 15 | 45.68 | 0.63 | 31 | 72 |
| 6677-93A | 30.8 | 1.62 | 10 | 45 | 46.13 | 0.648 | 70 | 107 |
| 6677-93B | 30 | 2.43 | 15 | 75 | 46.33 | 0.695 | 71 | 130 |
| 6677-93C | 29.2 | 3.24 | 20 | 120 | 46.68 | 0.666 | 75 | 130 |

TABLE 7

Melamine replacing urea Mole/Mole. Premix cooking at 32° C. (90° F.) for 3 hours.

| Samples | Urea (50%) g | Melamine g | Melamine % | Time hours | Solids % | Free CH$_2$O % | Stroke Cure, sec. start | end |
|---|---|---|---|---|---|---|---|---|
| 6677-94A | 2.5 | 0 | 0 | NA | 45.58 | 0.747 | 40 | 88 |
| 6677-94B | 30.88 | 1.71 | 5 | 1 | 46.36 | 0.541 | 40 | 110 |
| 6677-94C | 29.95 | 3.41 | 10 | 2.25 | 47.03 | 0.502 | 43 | 94 |
| 6677-94D | 27.62 | 5.12 | 15 | 3 | 47.43 | 0.486+ | 45 | 92 |

EXAMPLE IV

In order to maximize the formaldehyde take up efficiency of melamine, experiments were performed to determine at what point the melamine should be added to maximize the reaction of the melamine with the formaldehyde. As set forth in Tables 8–10 it was determined that adding melamine at about the same time as the urea is added to the phenol-formaldehyde resole resin appears to maximize the efficient use of the melamine in terms of maximizing its ability to react with the free formaldehyde. Although the reaction between the melamine and formaldehyde also proceeds well when the melamine is added before the urea, the reaction is significantly reduced when the melamine is added after the urea, i.e. the melamine fails to take up much of the free formaldehyde (See Tables 10 and 8 respectively). Accordingly, in a preferred embodiment of the present invention, the melamine is added at about the same time the urea is added to the premix.

TABLE 8

Melamine added 3 hours after urea addition.
Premix cooking at 32° C. (90° F.), for 6 hours.

| Samples | Urea* g | Melamine g | Melamine % | Time hours | Solids % | Free CH$_2$O % | Stroke Cure, sec. start | Stroke Cure, sec. end |
|---|---|---|---|---|---|---|---|---|
| 6677-96A | 32.5 | 0 | 0 | NA | 45.54 | 0.475 | 35 | 72 |
| 6677-96B | 32.5 | 2.25 | 5 | 4 | 46.95 | 0.424 | | |
| 6677-96C** | 32.5 | 4.5 | 10 | >4.5 | 46.93 | 0.399 | | |

*urea is 50% solution in water.
**1.52 g melamine remained undissolved.

TABLE 9

Melamine added with urea. Premix cooking at 32° C. (90° F.), for 3 hours.

| Samples | Urea g | Melamine g | Melamine % | Time hours | Solids % | Free CH$_2$O % | Stroke Cure, sec. start | Stroke Cure, sec. end |
|---|---|---|---|---|---|---|---|---|
| 6677-97A | 32.5 | 0 | 0 | NA | 46.02 | 0.735 | 40 | 86 |
| 6677-97B | 32.5 | 2.25 | 5 | 1.5 | 47.14 | 0.606 | 40 | 90 |
| 6677-85B | 32.5 | 3.38 | 7.5 | 2.75 | 48.03 | 0.454 | 33 | 88 |
| 6677-97C | 32.5 | 4.5 | 10 | 3 | 48.37 | 0.478 | 44 | 96 |

TABLE 10

Melamine added 2 hours before urea. Premix cooking at 32° C. (90° F.), for 4 hours.

| Samples | Urea g | Melamine g | Melamine % | Time hours | Solids % | Free CH$_2$O % | Stroke Cure, sec. start | Stroke Cure, sec. end |
|---|---|---|---|---|---|---|---|---|
| 6677-98A | 32.5 | 0 | 0 | NA | 46.21 | 1.2 | 53 | 135 |
| 6677-98B | 32.5 | 2.25 | 5 | 2 | 47.32 | 0.8 | 50 | 130 |
| 6677-98C | 32.5 | 4.5 | 10 | 2.5 | 48.09 | 0.578 | 51 | 100 |

EXAMPLE V

Further, experiments were performed to see if the addition of melamine had an effect on the stability of the premix and formaldehyde up take. As set forth in Table 11, these samples contained varying percentages of free formaldehyde levels. Further, a melamine additive was added to several of the samples.

Figure 2:
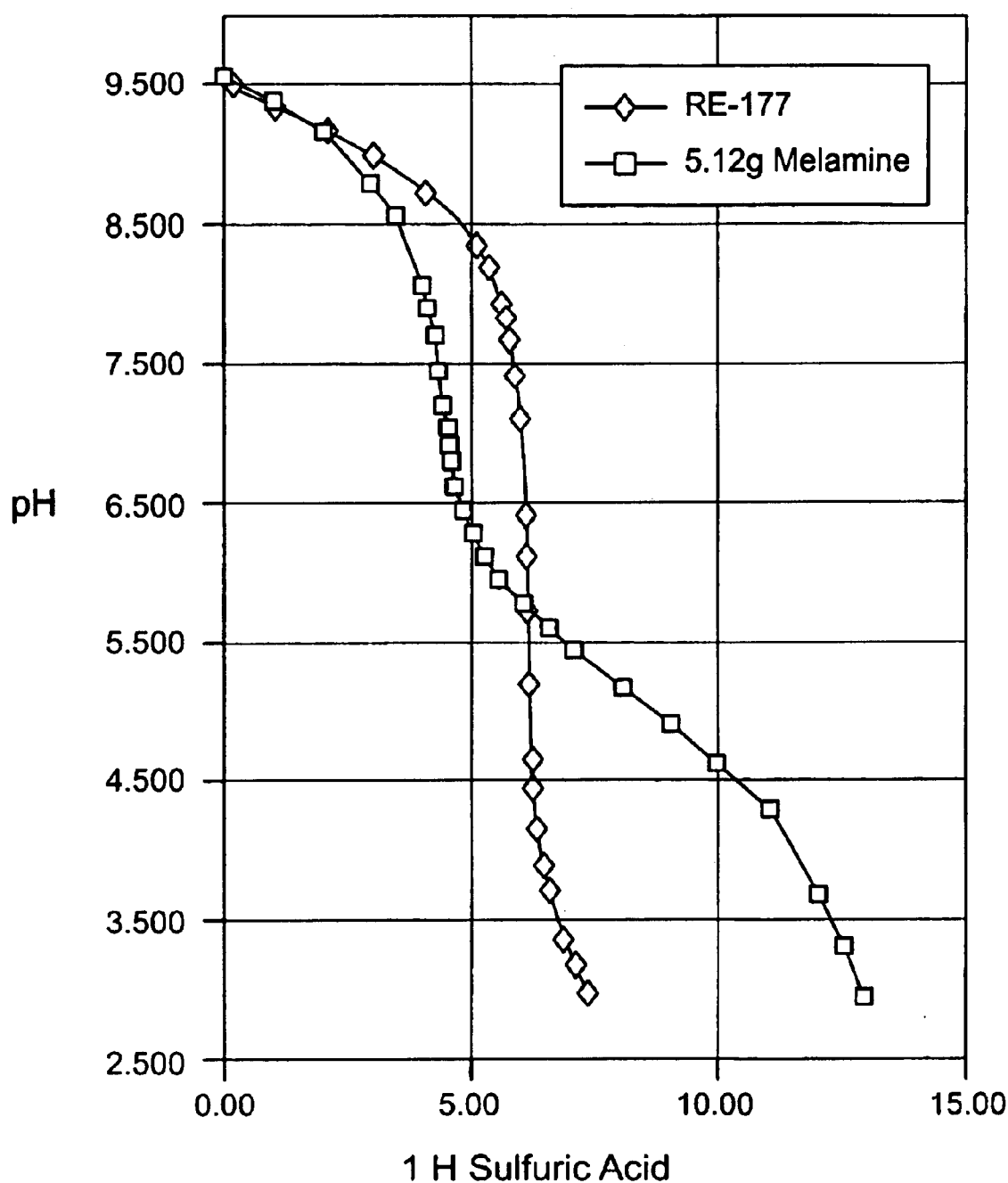
FIG. 2 is an acid titration histogram comparing phenolic binders with and without a melamine additive.

As set forth in Table 11, the addition of 5% melamine results in lower free formaldehyde (1) at the end of the premix cook; and (2) after being aged for 24 hours at room temperature 25° C. (77° F). Specifically, it was found that the higher the initial free formaldehyde the higher the reduction will be. For example, a comparison of samples 1 and 4 shows a 40% reduction of free formaldehyde by the addition of 5% melamine, while a comparison of samples 3 and 6 shows only about a 13% reduction. The addition of melamine also adds to the overall premix stability. One of the sources of instability in phenol/formaldehyde/urea system is the formation of dimethylol urea (hereinafter "DMU"). The DMU has low solubility, and precipitates out causing instability and filter plugage. The addition of melamine probably retards or inhibits DMU formation, and thus adds to the stability of the premix over a whole range of temperatures, as can be seen from Table 11. Further, the acid titration histograms of the premix (control) compared to the same premix containing 5% melamine are different. Specifically, the histogram of the control has only one inflection point at around pH=8.0–8.5, while the histogram of the binder of the present invention containing 5% melamine has two inflection points, at about pH=8.5 and at about pH=4.5. (See FIG. 2).

TABLE 11

Effect of melamine on the stability of the premix and % free formaldehyde.

| Samples | Free CH$_2$O in resin % | Melamine wt % | Solids % | Free CH$_2$O at end of cook % | Free CH$_2$O aged 24 hours, rt. % | Stability* 45° F. | Stability* 75° F. | Stability 90° F. |
|---|---|---|---|---|---|---|---|---|
| 1 | 15 | 0 | 46.49 | 1.3 | 0.69 | 16 hrs | 10 days | 3 days |
| 2 | 14 | 0 | 47.06 | 0.892 | 0.59 | 24 hrs | 12 days | 4 days |
| 3 | 13 | 0 | 45.86 | 0.623 | 0.54 | 16 hrs | 11 days | 4 days |
| 4 | 15 | 5 | 46.65 | 0.78 | 0.52 | 36 hrs | 12 days | 5 days |

TABLE 11-continued

Effect of melamine on the stability of the premix and % free formaldehyde.

| Samples | Free CH$_2$O in resin % | Melamine wt % | Solids % | Free CH$_2$O at end of cook % | Free CH$_2$O aged 24 hours, rt. % | Stability* 45° F. | Stability* 75° F. | Stability 90° F. |
|---|---|---|---|---|---|---|---|---|
| 5 | 14 | 5 | 47.49 | 0.726 | 0.489 | 48 hrs | 12 days | 5 days |
| 6 | 13 | 5 | 45.98 | 0.543 | 0.467 | 64 hrs | 11 days | 6 days |

*The premix solution stays clear to pH = 3, using the acid dilutability test methodology. This is the method by which the stability was measured.

EXAMPLE VI

A tube furnace test was performed to simulate the emissions of formaldehyde and ammonia from an insulation manufacturing plant's forming hood. Although, the standard deviation of this type of test is fairly large the results of this experimentation, as set forth in Tables 12 & 13, demonstrate that the addition of melamine reduces both ammonia and formaldehyde emissions. Specifically, 1.0 g samples of phenolic resole resins containing 15% solids were prepared for testing. As set forth in Tables 12 and 13, these samples contained varying amounts of the melamine additive. The resulting samples were then tested using a tube furnace (air flow—150 cc/min.). The samples were ramped to 330° F. in 40 seconds, held for 20 seconds, ramped to 270° F. in 15 seconds, and held for 1 minute 30 seconds before being removed from the tube furnace. The free formaldehyde emission levels of the samples were then measured spectrophotometrically, using a "Spectronic 20D+" manufactured by Spectronic Instruments, Inc., with acetylacetone at 412 nm. Further, the levels of free formaldehyde in the resulting samples were tested using the hydroxylamine hydrochloride method. The ammonia emissions were determined using an ion specific electrode.

As seen from the Tables, the addition of 5% melamine to a phenol-formaldehyde premix reduces the free formaldehyde emissions by about 35–40% and ammonia emissions by about 30%. This result is consistent with the measurement of the free formaldehyde level in the premix by the hydroxyl amine hydrochloride method.

TABLE 12

Formaldehyde emission using tube furnace method.

| | | | | CH$_2$O Emission (Tube furnace) | |
|---|---|---|---|---|---|
| Samples | Melamine, % | Solids, % | Free CH$_2$O, % (Hydroxylamine) | mg/g solid | mg/g binder |
| RE-177 | 0.0 | 48.45 | 0.484 | 2.107 | 0.140 |
| RE-177 | 0.0 | 48.45 | 0.484 | 2.544 | 0.170 |
| RE-177 | 5.0 | 49.03 | 0.447 | 1.669 | 0.111 |
| RE-177 | 5.0 | 49.03 | 0.447 | 1.723 | 0.115 |
| RE-177 | 7.5 | 49.35 | 0.356 | 1.875 | 0.125 |
| RE-177 | 7.5 | 49.35 | 0.356 | 2.033 | 0.136 |
| RE-177 | 10.0 | 49.96 | 0.417 | 1.470 | 0.098 |
| RE-177 | 10.0 | 49.96 | 0.417 | 1.582 | 0.105 |
| RE-177 | 0.0 | 48.36 | 0.476 | 2.275 | 0.152 |
| RE-177 | 0.0 | 48.36 | 0.476 | 2.052 | 0.137 |

TABLE 13

Ammonia emission using ion specific electrode from tube furnace test

| Samples | Melamine, % | Solids, % | mg/g Solid | Ammonia emission mg/g Binder |
|---|---|---|---|---|
| RE-177 | 0.0 | 48.45 | 1.949 | 0.130 |
| RE-177 | 0.0 | 48.45 | 1.963 | 0.131 |
| RE-177 | 5.0 | 49.03 | 1.386 | 0.092 |
| RE-177 | 5.0 | 49.03 | 1.440 | 0.096 |
| RE-177 | 7.5 | 49.35 | 1.131 | 0.075 |
| RE-177 | 7.5 | 49.35 | 0.985 | 0.066 |
| RE-177 | 10.0 | 49.96 | 1.644 | 0.110 |
| RE-177 | 10.0 | 49.96 | 1.468 | 0.098 |
| RE-177 | 0.0 | 48.36 | 1.586 | 0.106 |
| RE-177 | 0.0 | 48.36 | 1.586 | 0.104 |

The present invention also relates to phenolic binders comprising both a melamine and an ammonium lignosulfonate additive. The addition of both melamine and ammonium lignosulfonate additives to the phenolic resin premix can further reduce emissions, including phenol and formaldehyde. Further, the addition of both these additives also enhances the shelf life of the phenolic premix and its tolerance to water (solubility). This latter property has extremely important implications in the manufacturing of fiber glass insulation products, because it helps the phenolic resin resole and urea formaldehyde adducts in low solids binders (those binders capable of being sprayed onto the fibers during the insulation manufacturing process) to remain soluble.

EXAMPLE VII

A laboratory experiment was performed to determine the effect on the free formaldehyde levels by adding both a melamine and an ammonium lignosulfonate to a phenolic premix. The phenolic premix samples were prepared as described above, (RE-177), and the free formaldehyde levels of the resulting binders, after the cook, were measured using the hydroxyl amine hydrochloride method. The results of the experiment are set forth in Table 14 below. Using both ammonium lignosulfonate and melamine additives will also reduce free phenol levels, simply due to the dilution factor. For example, the use of 10% by weight additives will reduce the free phenol emissions by at least 10%.

TABLE 14

Addition of both melamine and lignin to a phenolic premix.

| Samples | Melamine % | Lignin % | Solids % | Free CH$_2$O % |
|---|---|---|---|---|
| Control | 0 | 0 | 45.61 | 0.747 |
| Borresperse NH | 5 | 2.5 | 46.02 | 0.649 |
| Borresperse NH | 5 | 5.0 | 45.99 | 0.798 |

TABLE 14-continued

Addition of both melamine and lignin to a phenolic premix.

| Samples | Melamine % | Lignin % | Solids % | Free CH$_2$O % |
|---|---|---|---|---|
| Borresperse NH | 5 | 7.5 | 46.52 | 0.609 |
| Control | 0 | 0 | 46.45 | 0.665 |
| Lignosite 17 | 5 | 2.5 | 46.65 | 0.607 |
| Lignosite 17 | 5 | 5.0 | 46.34 | 0.881 |
| Control | 0 | 0 | 45.89 | 0.816 |

Note: The hydroxyl amine hydrochloride method used to measure the free formaldehyde may not be the most accurate method used when formaldehyde up take by lignin is involved. Due to the low pH of this methodology, it is possible that the adducts of formaldehyde and lignin might not be stable enough. Accordingly, it is likely that the use of lignin additives will have a more pronounced effect on reducing free formaldehyde levels.

EXAMPLE VIII

Figure 3:
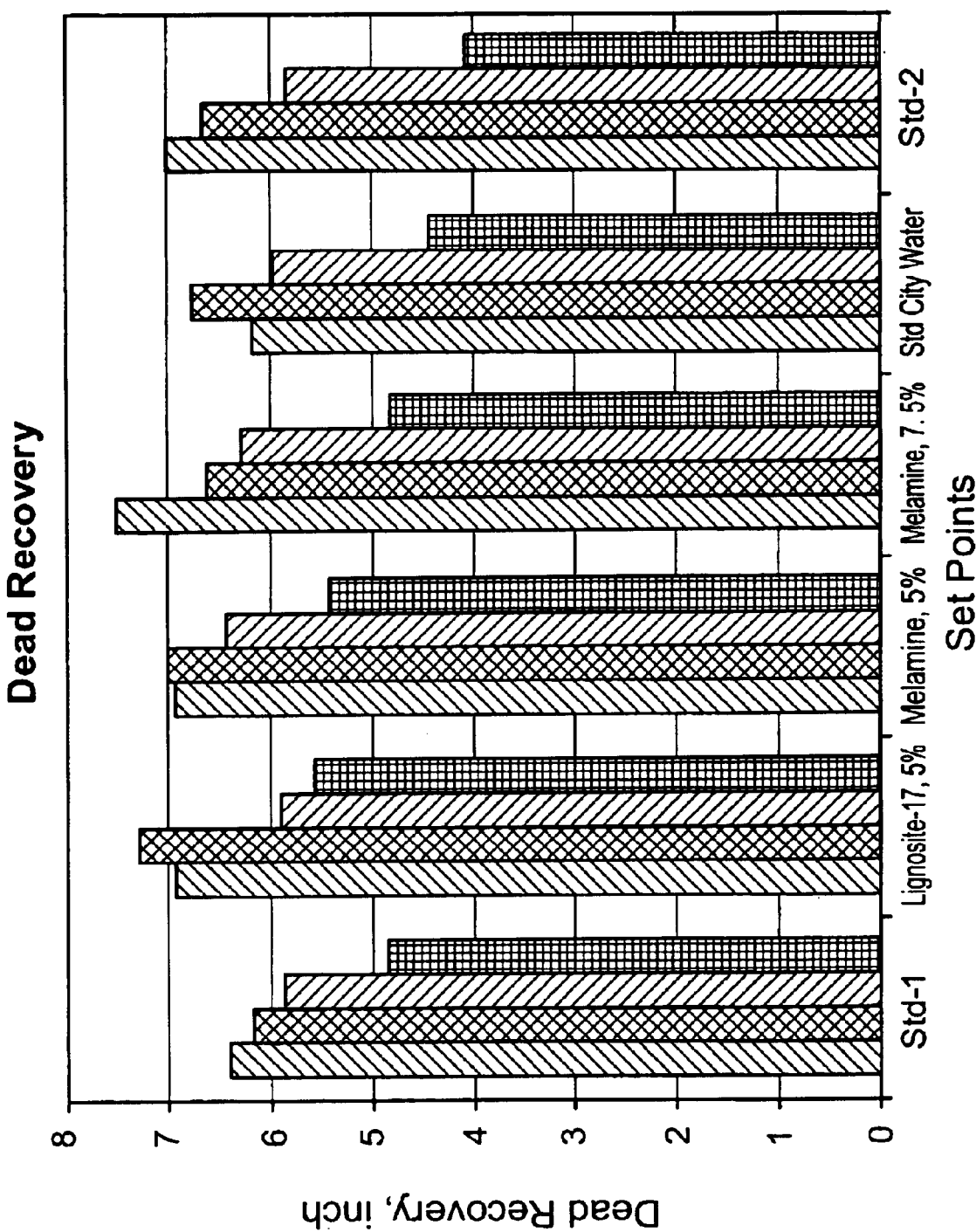
FIG. 3 is a bar chart showing a comparison of the dead recovery for products of the present invention and standard products at various set points, i.e., at the end-of-the-line (EOL), at one week, at six weeks, and when humid aged.

To confirm the results of the laboratory experiments set forth above, a trial was performed at a manufacturing plant to determine the effect of both melamine and ammonium lignosulfonate additives on the performance and properties of the insulation products made form phenolic binders. The properties measured included wool pack recovery, stiffness and dust generation. An unfaced R-19 building insulation product was used in the manufacturing plant trial. The results of the trial are set forth in Table 15 set forth below. Further, FIG. 3 shows a comparison of the dead recovery for the products at the various set points, i.e., at the end-of-the-line (EOL), at one week, at six weeks, and when humid aged.

The results of this trial demonstrate that the recovery of the products made with the binders of the present invention, comprising both melamine and ammonium lignosulfonate additives, at the various set points, are as good as the controls used. In fact, the ammonium lignosulfonate set points showed superior recovery. This is thought to be due to the plasticizing effect the ammonium lignosulfonate has on the insulation product. One of ordinary skill in the art will know that phenolic resins form three dimensional rigid networks upon curing. The application of ammonium lignosulfonate, having a bulky molecular structure, plasticizes the phenolic resin and thus contributes to the enhanced recovery properties of the resulting insulation product. The set points for the products made from the phenolic binders comprising 5% and 7.5% melamine also demonstrated overall superior dead and drop recovery properties over the standard products.

TABLE 15

Comparison of products made form phenolic binders comprising melamine and lignin with standard products.

|  | Std-1 | Lignosite-17 5% | Melamine 5% | Melamine 7.5% | Std City Water | Std-2 |
|---|---|---|---|---|---|---|
| EOL |  |  |  |  |  |  |
| Dead recovery, inch | 6.39 | 6.93 | 6.93 | 7.5 | 6.17 | 7 |
| Drop recovery, inch | 7.01 | 7.7 | 7.45 | 7.04 | 7.47 | 7.39 |
| Stiffness, degree | 29.75 | 20.75 | 13 | 13.5 | 33.25 | 14.5 |
| Dust, g | 0.016 | 0.017 | 0.02 | 0.017 | 0.017 | 0.016 |
| 1 Week |  |  |  |  |  |  |
| Dead recovery, inch | 6.16 | 7.28 | 7.01 | 6.61 | 6.75 | 6.64 |
| Drop recovery, inch | 7.21 | 7.35 | 7.5 | 7.22 | 7.67 | 7.4 |
| Stiffness, degree | 34.5 | 47.5 | 14 | 25 | 38.25 | 37.5 |
| Dust, g | 0.011 | 0.023 | 0.012 | 0.02 | 0.024 | 0.016 |
| 6 Weeks |  |  |  |  |  |  |
| Dead recovery, inch | 5.85 | 5.91 | 6.44 | 6.29 | 5.94 | 5.83 |
| Drop recovery, inch | 7.26 | 7.3 | 7.41 | 7.36 | 7.24 | 7.2 |
| Stiffness, degree | 57.37 | 47.25 | 37.12 | 38.12 | 39.12 | 44.12 |
| Dust, g | 0.025 | 0.017 | 0.023 | 0.017 | 0.024 | 0.015 |
| Humid aged |  |  |  |  |  |  |
| Dead recovery, inch | 4.83 | 5.54 | 5.42 | 4.8 | 4.41 | 4.05 |
| Drop recovery, inch | 5.61 | 6.27 | 5.99 | 5.49 | 5.12 | 4.58 |
| Stiffness, degree | 65 | 42 | 55 | 62 | 53 | 69 |
| Dust, g | 0.1 | 0.082 | 0.075 | 0.107 | 0.064 | 0.075 |

Std-1 - standard production material made from standard binder that is collected at the beginning of the trial.
Lignosite-17 5% - standard binder containing 5% (based on binding solid).
Melamine 5% - standard binder containing 5% by weight (based on binding solid) of melamine powder.
Melamine 7.5% - standard binder containing 7.5% weight (based on binding solid) of melamine powder.
Std City Water - standard binder made with city water substitute for wash water (plant waste water).
Std-2 - standard production material made from standard binder that is collected at the end of the trial.

The phenolic binder composition of the present invention may also comprise a lubricant composition, such as a mineral oil emulsion, and a material promoting adhesion of the modified resole resin to the glass fibers, such as a suitable silane. An example of an adhesion-improving silane which can be added is 3-aminopropyl triethoxysilane. Other additives such as finely divided mineral fibers, non-reactive organic resins such as Vinsol (trademark of Hercules) resin (derived from rosin), tall oil, surface active compounds such as lignosulfonate salts, thickeners and rheology control agents, dyes, color additives, water, and the like, may also be added to the aqueous binder.

We claim:

1. A phenolic binder comprising an aqueous mixture of:
   (a) an aqueous resin mixture in which an aqueous solution of urea and a mixture comprising water, formaldehyde, and phenolic resole resin have been heated and agitated to react said urea and said formaldehyde;
   (b) a curing agent; and
   (c) ammonium lignosulfonate.

2. The phenolic binder as claimed in claim 1, wherein the curing agent is selected from the group consisting of ammonium sulfate, ammonium phosphate, ammonium sulfamate, ammonium carbonate, ammonium acetate, ammonium maleate.

3. The phenolic binder as claimed in claim 1, wherein the ammonium lignosulfonate is the additive and comprises not more than about 35% of the curing agent based upon the weight of the curing agent.

4. The phenolic binder as claimed in claim 1 comprising about 5–15% ammonium lignosulfonate based upon the weight of the urea solids.

5. The phenolic binder as claimed in claim 4 comprising about 10–15% ammonium lignosulfonate based upon the weight of the urea solids.

6. The phenolic binder as claimed in claim 5 comprising about 10% ammonium lignosulfonate based upon the weight of the urea solids.

7. The phenolic binder as claimed in claim 1, comprising not more than about 20% ammonium-1 lignosulfonate based upon the weight of the phenolic binder solids.

8. The phenolic binder as claimed in claim 1, wherein the phenolic binder also comprises a melamine additive.

9. The phenolic binder as claimed in claim 8 comprising not more than 20% melamine based upon the weight of the phenolic binder solids.

10. The phenolic binder as claimed in claim 9 comprising not more than about 15% melamine based upon the weight of the phenolic binder solids.

11. The phenolic binder as claimed in claim 10 comprising not more than about 10% melamine based upon the weight of the phenolic binder solids.

12. The phenolic binder as claimed in claim 11 comprising about 5% melamine based upon the weight of the phenolic binder solids.

13. The phenolic binder as claimed in claim 1, wherein the premix is prepared by mixing a urea solution with a phenolic resole resin, wherein the urea solution comprises about 50 weight percent urea in water, and the phenolic resole resin comprises between about 40–50 weight percent solids in water.

14. The phenolic binder as claimed in claim 1, comprising between about 42–50% by weight of the premix of a urea modified phenol-formaldehyde resole resin, based upon the total weight of the phenolic binder solids.

15. The phenolic binder as claimed in claim 1, comprising between about 0.1–5% by weight of the curing agent, based upon the weight of the premix of the urea modified phenol-formaldehyde resole resin.

16. The phenolic binder as claimed in claim 2, wherein the curing agent is ammonium sulfate.

17. A phenolic binder comprising:
   (a) between 42–50% by weight of a premix of urea modified phenol-formaldehyde resole resin, based upon the total weight of phenolic binder solids;
   (b) between about 0–1.5% by weight of the curing agent, based upon the weight of the premix of the urea modified phenol-formaldehyde resole resin;
   (c) between about 5–10% by weight of a melamine additive, based upon the weight of the phenolic binder solids; and
   (d) between about 5–10% by weight of ammonium lignosulfonate, based upon the weight of the phenolic binder solids.

18. A method for preparing a phenolic binder for reducing gaseous emissions in the manufacture of fibrous insulation materials comprising the steps of:
   (a) adding a premix of urea modified phenol-formaldehyde resole resin;
   (b) adding a curing agent;
   (c) adding ammonium lignosulfonate; and
   (d) applying the phenolic binder to a fibrous material.

19. A method for reducing gaseous emissions in the manufacture of fibrous insulation materials comprising the steps of:
   (a) agitating and heating an aqueous resin mixture of an aqueous solution of urea and a mixture comprising water, phenolic resole resin, and formaldehyde to react said urea and said formaldehyde;
   (b) adding a curing agent to said aqueous resin mixture;
   (c) adding ammonium lignosulfonate to said aqueous resin mixture;
   (d) applying the aqueous solution from the above steps (a), (b) and (c) to a fibrous material.

20. The method as claimed in claim 19, wherein the fibrous material is fiberglass.

21. The method of claim 19, wherein the phenolic binder also comprises a melamine additive.

22. The phenolic binder of claim 8 wherein said melamine additive reduces the amount of formaldehyde in the premix by at least 40% by weight.

* * * * *